Jan. 10, 1967 W. L. RUMPLE 3,297,266

SPEED CONTROL SYSTEM

Filed Jan. 11, 1963 2 Sheets-Sheet 1

WILBURN L. RUMPLE
INVENTOR.

BY Nathan N. Kallman

ATTORNEY

WILBURN L. RUMPLE
INVENTOR.
BY Nathan N. Kallman
ATTORNEY 3,297,266
SPEED CONTROL SYSTEM
Wilburn L. Rumple, Palo Alto, Calif., assignor to Ampex Corporation, Redwood City, Calif., a corporation of California Filed Jan. 11, 1963, Ser. No. 250,876
5 Claims. (Cl. 242—55.12)

This invention relates to speed control systems, especially those used in driving elongated strip materials at controlled speeds, and more particularly to variable speed, low cost magnetic tape transports.

A common technique for holding the speed of a moving strip constant involves control by means of a drive capstan. The tape is driven by the direct contact of the capstan circumference on the tape surface, with a pinch roller provided on the opposite side of the tape to reduce slippage to a minimum. Using a synchronous motor driven from a stable A.C. supply, the capstan is relied upon to stabilize tape speeds between constant torque supply and takeup reels. These capstan drives are most often employed in magnetic tape systems where it is necessary to eliminate high speed longitudinal variations. To change speeds, variable pulley and gear arrangements are used to gain multiples of a basic speed.

Some disadvantages accrue from use of the capstan drive system. First, separate constant speed capstan drives and constant torque drives make this system more complex than desirable, particularly where tape speed changes are necessary. There are also many moving parts resulting in higher cost and greater maintenance. The capstan and the associated pinch roller must be carefully adjusted but still cannot control the speed of the tape as well as desired. Additionally, the pressure and movement of the capstan on the tape causes tape wear and the accumulation of static charges in the system.

Furthermore, with the capstan drive system, tape speed variations are limited to multiples of the synchronous motor speed, the motor speed itself being completely subject to any variation in the supply frequency and voltage. These systems also have high power consumption in relation to the amount of power needed for simple movement of the tape between the reels.

Some tape transport systems do not use capstan drives but transport the tape by driving the takeup or supply reels. Driving the reels at a constant speed produces a varying tape speed dependent upon the amount of tape contained on the driven reel. It is possible to sense the amount of tape upon the reel and to drive the reel at a computed speed to maintain a relatively constant tape speed, but the complexity of such systems is excessive for most practical applications.

Ideally, a strip or tape drive control should have a continuous range of speed adjustment provided with simple electronics and low power consumption. The speed should be independent of the supply variations in the moving strip. Nevertheless, such a system should operate with low tape wow and flutter over the entire speed range.

Therefore, it is an object of this invention to provide a transport system for driving elongated strip material at controlled variable speeds over a continuous speed range.

Another object of this invention is to provide a system for driving elongated strip materials at continuously controlled speeds which is mechanically simple and has a low power consumption.

A further object of this invention is to provide an improved magnetic tape transport system for driving the tape at constant selected speeds in a continuous range, which system is mechanically simple, inexpensive, and has low power consumption.

A still further object of this invention is to provide an improved speed control arrangement especially useful in driving elongated strip material at controlled speeds.

A still further object of this invention is to provide an improved system for electrically controlling the speed of a driven member by control signals.

Mechanisms for driving strip materials at controlled rates, in accordance with the invention, utilize no capstan drive but sense the actual speed of the strip material. A pulse generator driven by the strip material is used to provide pulses of controllable duration at corresponding repetition rates from which control of strip material movement is effected directly.

In a magnetic tape transport, as one example, a D.-C. motor is coupled directly to one of the reels, to control the speed of a tape passing between supply and takeup reels without intermediate capstan drive devices. A pulse generator coupled to be driven by movement of the tape provides pulses at a selected rate for a given nominal tape speed. This pulse rate information is converted to a rectangular pulse train by application to a controllable multivibrator which can be set as to output pulse duration. A low pass filter coupled to the multivibrator then generates, from the pulse train, a D.-C. error signal which is amplified and appropriately converted to act as the driving signal for the D.-C. motor. Changes in tape speed result in a change in the proportion of positive-going and negative-going components of the multivibrator output, and consequently varies the error signal from the low pass filter. The error signal is then used to change the amount of voltage applied across the rotor windings of the D.-C. motor to produce the motor speed required to maintain the desired tape speed. Any desired tape speed within a wide range may be selected simply by adjusting the reset time of the multivibrator which determines the output pulse duration of one of the components.

A better understanding of the invention may be had by reference to the following description, taken in conjunction with the accompanying drawing, in which.

Figure 1:
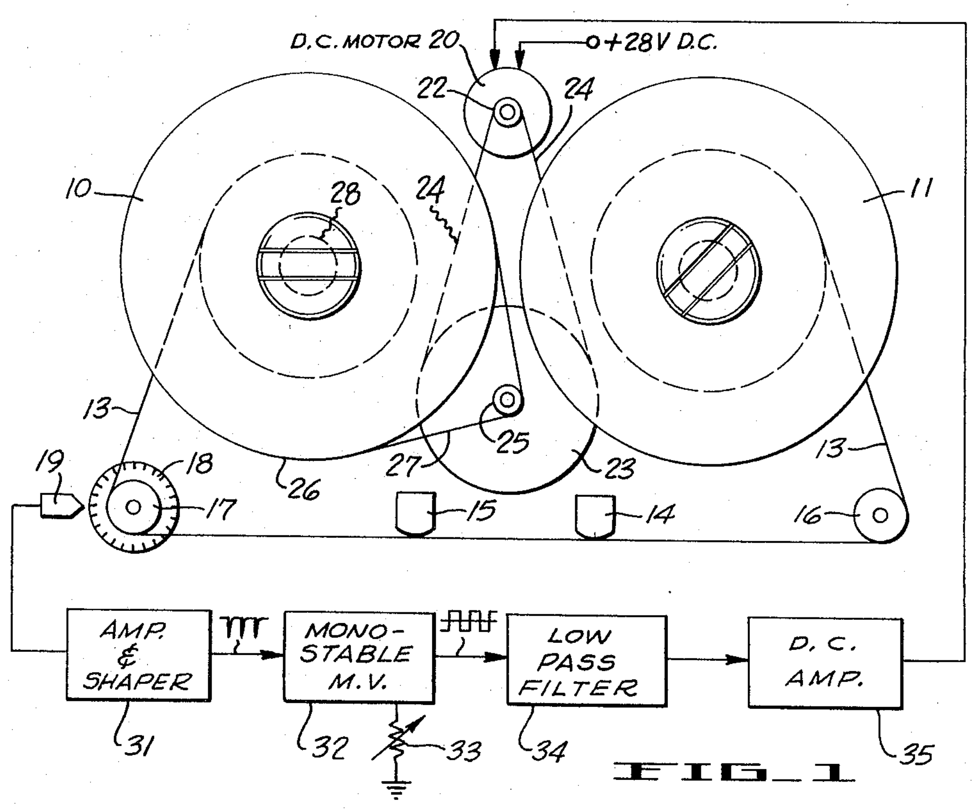
FIGURE 1 is a diagrammatic view of one form of tape transport system, in accordance with the invention.

FIGURE 1 illustrates in simplified form the principal elements of a tape transport system in accordance with the invention. Recording and reproducing circuits, drive controls and reel mountings may be of any conventional form and are accordingly not shown in detail. Only very few operative elements need be employed, however, as seen in FIGURE 1. A tape takeup reel 10 and a tape supply reel 11 mounted upon a tape transport front panel provide a length of tape 13 extending along a tape path which passes across a recording magnetic transducer 14 and a reproducing magnetic transducer 15. The linear tape path across the transducers 14 and 15 is established by a pair of spaced guide rollers 16 and 17, a first one of which acts as a speed sensing means. To this end, the first guide roller 17 is configured to include or to have attached thereto a timing wheel 18 having a circumferential indicia pattern, in the form of incremental, equally spaced magnetic, electrical or optical variations. As one example, a stationary magnetic head 19 is positioned adjacent the timing wheel 18 to generate pulses from individual circumferential permeability variations during rotation of the guide roller 17. Those skilled in the art will recognize that any number of indicia markings and sensing arrangements may be used, including a photoelectric indicia and sensing system.

The circumference of the timing wheel 18 is provided with a total number of circumferential positions appropriate to the generation of a selected pulse repetition rate for a given tape speed. In the present example, a tape speed of eight inches per second is chosen as a median value for the operating range. With an appropriate guide roller diameter for a 1.904 revolutions per second rotational rate at the eight inch per second median tape speed, the timing wheel should have 105 circumferentially disposed incremental indicia.

The takeup reel 10 is driven by a speed reduction pulley system from a D.C. motor 20 which is coupled to receive the variable drive signals generated in the operation of the system. Typical pulley sizes useful in achieving a suitable degree of speed reduction are a series consisting of a one-half inch pulley 22 mounted on the motor shaft, a coupled four inch pulley 23 driven by a connecting belt 24, another one-half inch pulley 25 mounted on the shaft of the four inch pulley 23, and a 9½ inch turntable 26 driven from the one-half inch pulley 25 by the belt 27. The takeup reel 10 may be either mounted on the turntable directly or on a common shaft 28, if desired. The supply reel 11 may be lightly restrained by friction and driven by conventional coupling means (not shown) for high speed rewind operations. For this driving arrangement and the associated circuitry, only a small D.C. motor 20 need be employed.

A pulse train representative of tape speed is continually generated by a pulse amplifier and shaper circuit 31 coupled to receive the signals from the magnetic head 19. This circuitry may be conventional and accordingly is not shown in detail, but may consist of a peak detector or a differentiator circuit driving a pulse generator of the blocking oscillator type which has a short cycling time. Sharp voltage spikes derived from this circuitry clearly define in time the passage of the successive increments of the timing wheel 18, and thus the advance with time of the tape itself. These output voltage spikes are then used to trigger a controllable pulse generator, here comprising a monostable multivibrator circuit 32 having a "set" or "on" state with a controlled duration. The "on" pulse width may be varied in a well-known manner by the adjustment of one of the elements, such as a variable resistor 33, to change the time constant of the reset circuitry. Other circuits for the same purpose will suggest themselves to those skilled in the art, including a bistable multivibrator and variable delay circuit combination. With the latter combination, the bistable multivibrator may be set "on" by each input pulse, with the same pulses also being applied at a later time to a reset input terminal through a variable delay line. Thus, the output signal at the "on" terminal will appear as a rectangular waveform consisting of a series of rate modulated pulses.

Whatever the form of the variable duration pulse generator used, the setting establishing the "on" pulse duration is maintained constant in amplitude and duration for a given desired tape speed. The output signal, however, varies in the repetition rate of the pulses from the monostable multivibrator 32, and accordingly in the proportion of time that the signal remains in one polarity sense as against the other polarity sense. The "on" pulse duration is selected so that if the speed is exact each positive-going pulse is equal in duration to each negative-going pulse. The pulse generator may be arranged to provide equal amplitude voltage deviations from a ground base line, so that a coupled low pass filter 34 provides a D.C. output signal from the rectangular waveform whose amplitude indicates the degree of any imbalance and whose polarity indicates its sense. Other signal averaging circuits may also be employed, and a ground base line need not be used, as will be evident to those skilled in the art.

In a practical example of a system in accordance with the invention, a low pass filter 34 having an upper limit of eleven cycles per second provides a suitable error signal. A driver D.C. amplifier 35 is coupled to control the variable speed D.C. motor 20 from this error signal. The D.C. amplifier 35 is responsive to the D.C. error signal to vary the amount of current delivered to the rotor windings of the D.C. motor 20 and thus completes the speed control portion of the tape transport system.

Figure 2:
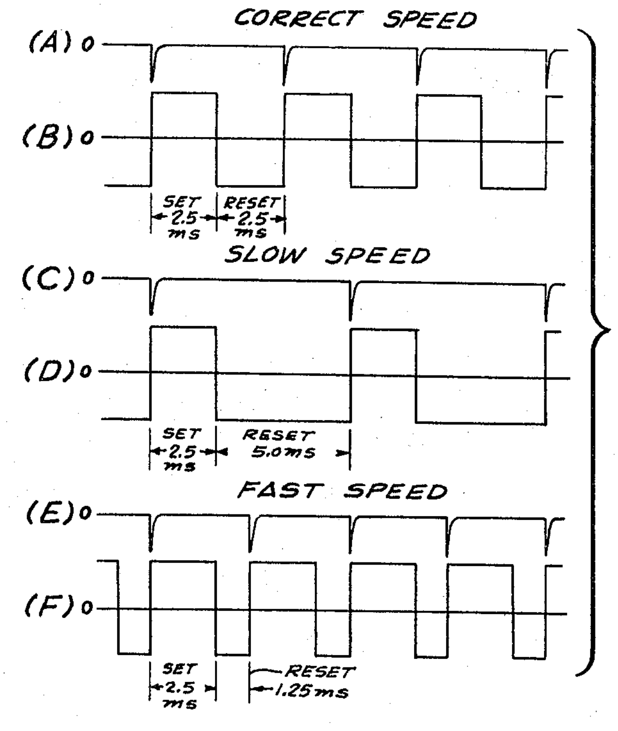
FIGURE 2 is a graphical diagram of various idealized waveforms generated at different points in the system of FIGURE 1 under various conditions.

Understanding of the operation of the invention is made easier by consideration of the waveforms of FIGURE 2 along with the system of FIGURE 1. The trigger signals generated from the timing wheel 18 and the indicia sensor 19 are at a normal rate of one per five milliseconds for a desired tape speed of eight inches per second (FIGURE 2A). Thus the pulse generator is adjusted to provide an "on" pulse of 2.5 milliseconds before resetting, as shown by FIGURE 2B. This is the positive-going portion of the signal which varies between equal plus and minus voltage amplitudes about a zero volt base line. If the tape moves too slowly, the triggering pulses will be too widely spaced (FIGURE 2C), inasmuch as the monostable multivibrator 32 remains for a longer time during each cycle of its operation in the reset condition than the set condition (FIGURE 2D), and a negative D.C. error signal is derived from the low pass filter 34. Such a signal acts to increase the speed of the D.C. motor 20 thereby restoring the tape to the selected normal speed. Conversely, too fast a speed results in the triggering pulses being too closely spaced (FIGURE 2E), the positive portion of the multivibrator output waveform (FIGURE 2F) is now greater in area, thus providing a net positive D.C. signal to slow the D.C. motor.

Systems in accordance with this invention are readily adjustable for tape speeds from two inches per second to sixteen inches per second using standard circuit elements although there is no inherent limitation on the tape speed range which can be achieved. Throughout this range, the speed of the tape remains substantially constant, as evidenced by typical flutter measurements of 0.25% to 0.50% r.m.s. from 0 to 250 cycles per second for practical exemplifications.

Eliminating the need for complicated and costly capstan drive systems with their numerous associated elements is merely one of the advantages of the system, although an important one. This system greatly reduces or completely eliminates various problems caused by frictional wear on the tape, by capstan and pinch roller eccentricity, and by the difficulty in guiding the capstan driven tape. This is accompanied by a substantial reduction in the amount of power needed to operate the tape transport system. An exemplary system according to this invention operates with a power drain of approximately ten watts D.C. only, including both the motor and the electronic circuits. The power supply itself may vary widely, as over a plus or minus 20% range from a nominal 24-volt D.C. value, without affecting performance. The system is therefore ideal for compact and portable installations.

Figure 3:
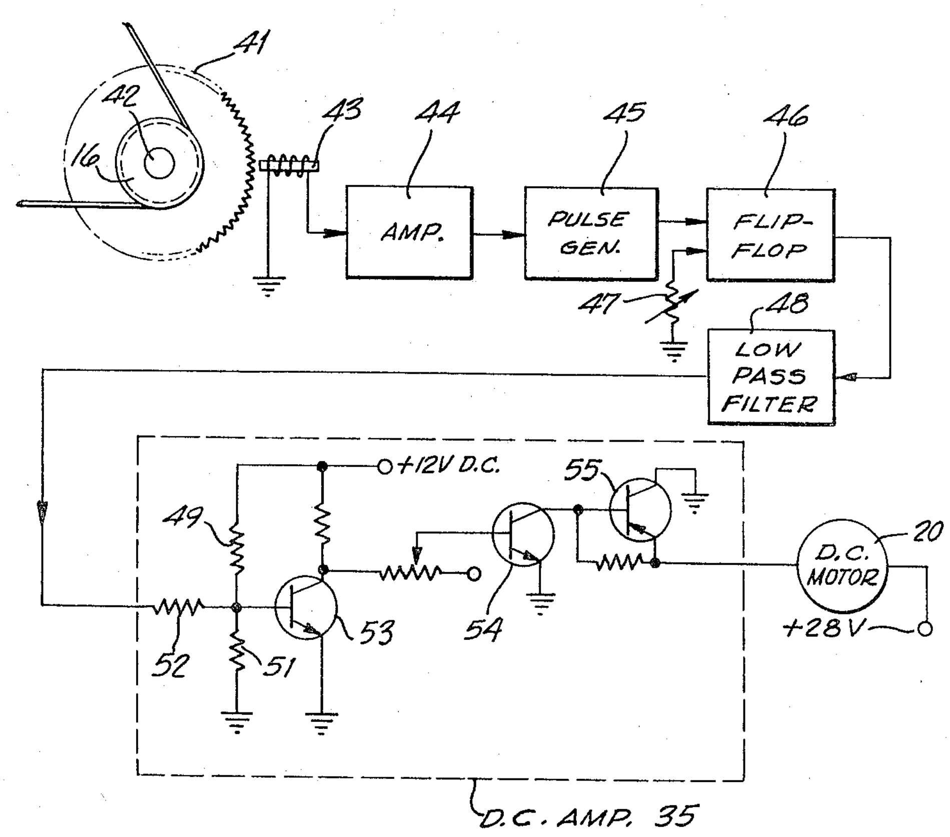
FIGURE 3 is a schematic diagram, partly in block, of an amplifier motor arrangement which may be used in the system of FIGURE 1.

FIGURE 3 provides an example of one form of an error signal generator and a driver amplifier which may advantageously be used in systems in accordance with the invention. In this case, the timing wheel 41 is attached by a common shaft 42 to the guide roller 16. The timing wheel 41 includes a circumferential variable permeability pattern, in the form of 105 equally spaced teeth or serrations cut into the magnetic material forming the circumference of the wheel. A stationary magnetic core 43 is placed with one end closely adjacent to the circumference of the wheel 41 to sense the indicia pattern formed by the teeth. Changes in the magnetic pattern caused by movement of the teeth past the end of the core 43 are sensed by a pickup winding and fed to an amplifier 44. The alternating signals from the amplifier 44 can then be used by a blocking oscillator type pulse generator 45 to generate a spiked pulse once each cycle to indicate the passage of each tooth on the wheel 41. The flip-flop 46 is adjusted by means of the variable resistor 47 in the reset circuit to produce an "on" pulse equal to half of the time interval between the passage of the successive teeth when the tape is traveling at the desired speed.

With the tape moving at its selected nominal speed, the speed sensing means maintains a zero volt "base line" level at the output of the coupled low pass filter 48. A zero volt "base line" is not necessary, as pointed out previously, but is only employed to simplify the description. It will later be apparent to those skilled in the art that the base line may be chosen at any convenient voltage level and might even be made variable so that it could be employed as a vernier adjustment of the speed. Likewise, the amplitude of either the positive-going or negative-going pulses could be made variable for vernier adjustment.

Additionally, those skilled in the art will recognize that the separate timing wheel and the pulse generator 45 may be omitted if trigger pulses are recorded upon a separate timing track on the tape itself. These pulses can then be played back and compared to a selected standard (delay line or the like) to check the actual tape speed. It is also possible to play back the timing track from the tape into a narrow band filter selected for the appropriate speed and to use a high pass and a low pass filter on either side of the narrow band to determine whether the speed is high or low.

Returning now to the example of FIGURE 3, the voltage from the output of the low pass filter 48 to the input of the driver amplifier 35 is nominally zero when the tape speed corresponds to the selected speed. Assume that the operating point of the amplifier 35 is originally set to allow a flow of current to the armature of the D.C. motor 20 to obtain a speed of 5600 r.p.m. This is accomplished by choosing resistors 49 and 51 to provide the desired static bias voltage to the base of transistor 53. Any error signal is then applied through resistor 52 to the bias from its static level. When the tape speed is fast, the error signal is positive and increases the bias at the base of the N-P-N transistor 53 thus reducing its emitter voltage. The lowered emitter voltage is then applied to the base of the second N-P-N transistor 54 to increase its emitter-to-collector impedance. This reduces the base current of the P-N-P transistor 55 since the base of transistor 55 is connected to the collector of transistor 54 in conventional D.C. amplifier fashion. The transistor 55, with its collector grounded, is in series with the armature windings of the D.C. motor 20. The decrease in the base current of transistor 55 raises the voltage at its emitter, resulting in a lower voltage being applied across the armature windings of the D.C. motor 20. The D.C. motor 20 is of the type having a separately excited field and the decrease in the armature voltage causes the motor 20 to slow down. The opposite is true when the speed is too slow and the motor 20 will thus seek the operating point of minimum error voltage.

While the invention has been particularly shown and described with reference to a preferred embodiment and a simplified exemplification of a servo control tape drive, it will be understood by those skilled in the art that the foregoing and other changes in the form and details may be made therein without departing from the spirit and scope of the invention.

What is claimed is:

1. A system for controlling the speed of a medium comprising:

drive means for imparting movement to the medium, said drive means including a variable speed motor whose speed is determined by the magnitude of a control signal;

speed sensing means including an indicia bearing member having a speed of movement proportional to the speed of movement of the medium and an indicia sensing means for producing a signal for each uniformly spaced indicia sensed;

adjustable pulse means responsible to each signal from the indicia sensing means for providing rate modulated pulses having one fixed signal level and a fixed duration representative of the desired speed of the medium and a second fixed signal level until receipt of the next signal from the indicia sensing means, said second level persisting for times varying in accordance with said speed of movement of said indicia bearing member; and filtering means responsive to the rate modulated pulses for providing a control signal amplitude to the motor for controlling the speed of the medium drive means.

2. A variable speed magnetic tape transport system comprising:

supply and takeup reels;

D.C. motor means coupled to drive at least the takeup reel;

rotatable pulse generator means coupled to be driven by the tape, the pulse generator means providing a selected pulse repetition rate at a given nominal tape speed;

controllable pulse generator means coupled to the pulse generator means and providing pulses of controlled duration and fixed amplitude in response thereto, said pulses being separated by time intervals varying in accordance with variations in said pulse repetition rate;

low pass filter means responsive to pulses from the controllable pulse generator means to produce an output signal having an amplitude proportional to the actual tape speed; and circuit means coupled to receive the output signal of the low pass filter means for delivering a control signal to the D.C. motor means.

3. A speed control system for magnetic tape transports which include a tape takeup reel comprising:

variable speed motor means for driving the tape takeup reel;

rotatable means in engagement with the tape and driven thereby, the rotatable means including incremental indicia uniformly disposed thereon;

means for sensing the incremental indicia to provide timing pulses representative of the tape speed;

multivibrator means coupled to receive the timing pulses, the multivibrator means being adjustable to generate output pulses of selected duration or amplitude upon the receipt of each timing pulse;

low pass filter means coupled to receive the output pulses from the multivibrator means; and driver amplifier means coupled to the low pass filter means for controlling the variable speed motor means in accordance with the magnitude of the signal from the low pass filter means.

4. A motor speed control system comprising:

a variable speed D.C. motor;

means coupled to be driven by the D.C. motor for producing timing pulses at a frequency proportional to the speed of the D.C. motor;

pulse means coupled to the timing pulse generating means for producing rectangular pulses of selectable constant amplitude or selectable duration in response to each timing pulse, said rectangular pulses being separated by time intervals varying in accordance with variations in the frequency of said timing pulses; and low pass filter means for producing a D.C. motor control signal having an amplitude proportional to the product of the selected pulse width and the timing pulse frequency to drive the D.C. motor at the selected speed.

5. A system for controlling the speed of a medium comprising drive means for imparting movement to the medium, said drive means including a variable speed motor whose speed is determined by the magnitude of a control signal, speed sensing means including an indicia bearing member having a speed of movement proportional to the speed of movement of the medium and an indicia sensing means for generating a trigger pulse for each uniformly spaced indicia sensed, a monostable multivibrator coupled to said indicia sensing means in receiving relation to said trigger pulses, said multivibrator having an on state of adjustable duration triggered in response to each of said trigger pulses, said multivibrator thereby generating a rate modulated rectangular wave pulse train representative of the speed of movement of said medium, and means coupled to said multivibrator for averaging said rectangular wave pulse train to produce a control signal having a magnitude proportional to the rate modulation thereof and applying said control signal to said motor.

References Cited by the Examiner

UNITED STATES PATENTS

| | | | |
|---|---|---|---|
| 1,976,355 | 10/1934 | Mees et al. | 318—313 |
| 2,678,821 | 5/1954 | Masterson | 226—30 |
| 2,777,964 | 1/1957 | DiMino | 242—75.51 X |
| 2,781,984 | 2/1957 | Buslik et al. | 242—75.51 |
| 2,794,945 | 6/1957 | Celmer | 318—309 |
| 2,913,652 | 11/1959 | Greenberg et al. | 318—309 |
| 3,008,075 | 11/1961 | Scott | 318—314 |
| 3,114,850 | 12/1963 | Hansen | 242—75.51 X |

FRANK J. COHEN, *Primary Examiner.*

MARVIN STEIN, G. F. MAUTZ, *Assistant Examiners.*